Jan. 23, 1968  B. J. BERNSTEIN  3,364,704
AUTOMATIC SAFETY GAS TORCH
Filed Feb. 4, 1966  3 Sheets-Sheet 1
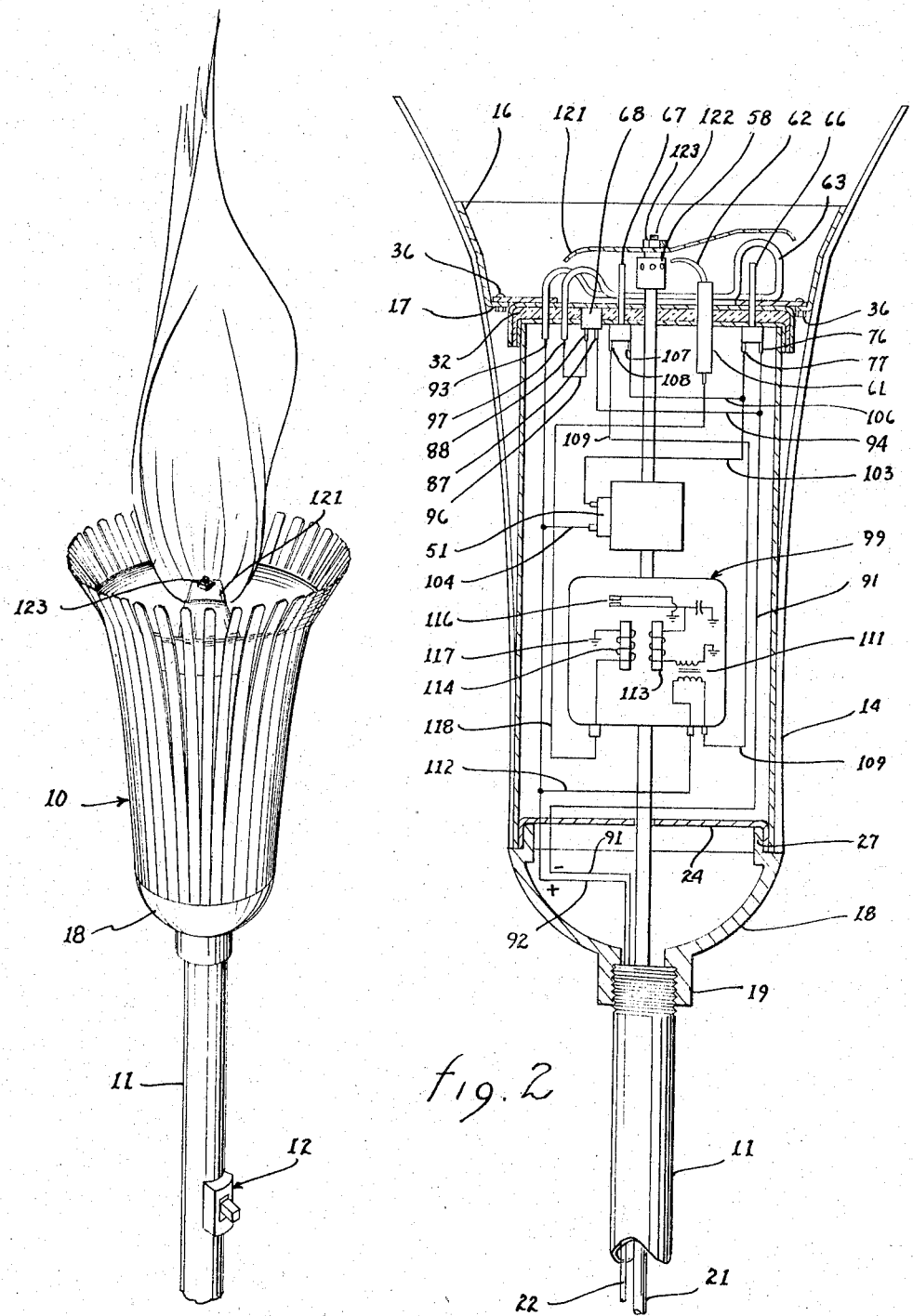
INVENTOR.
BERNARD J. BERNSTEIN
BY John J. McLaughlin
ATTORNEY

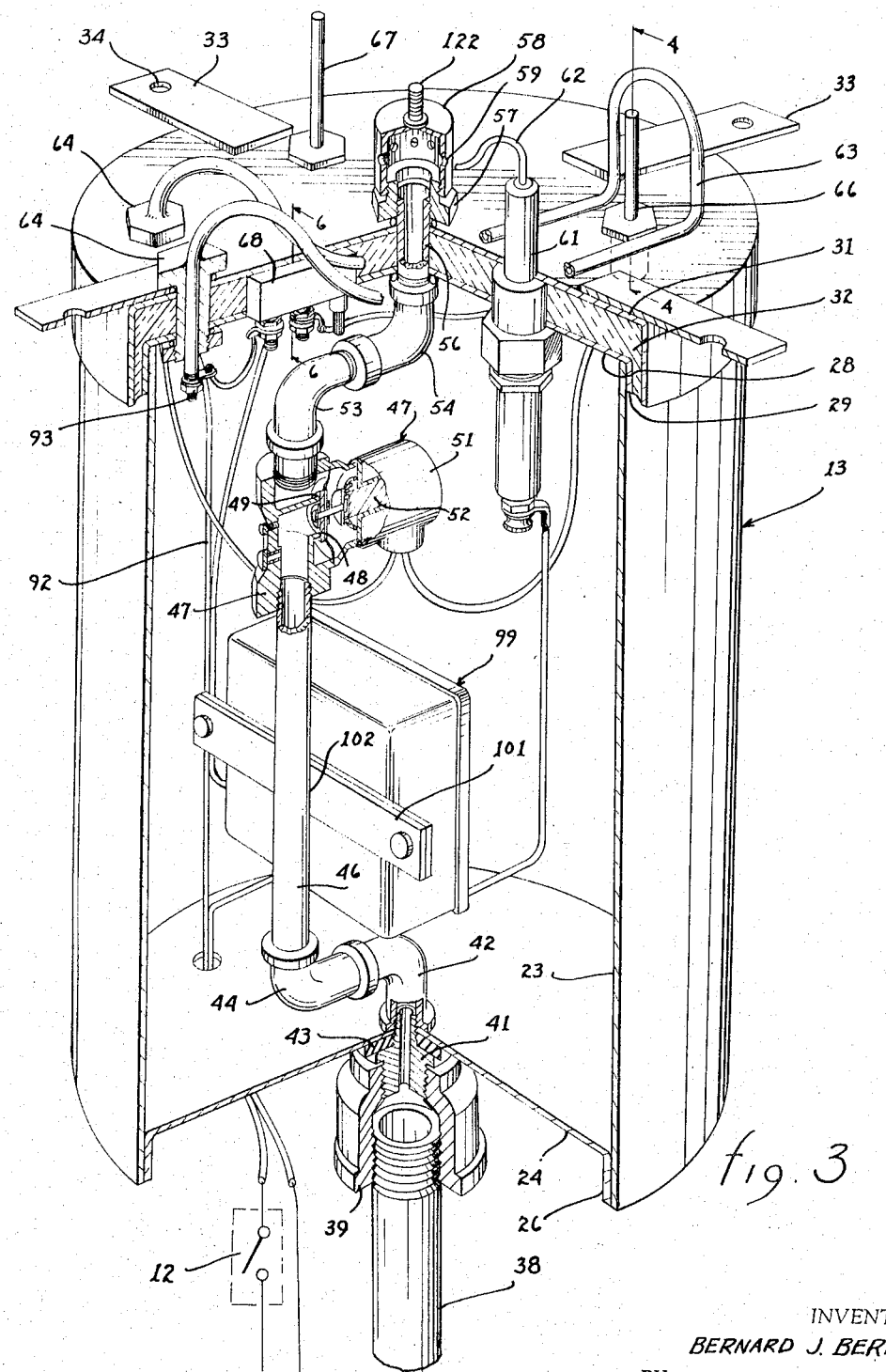

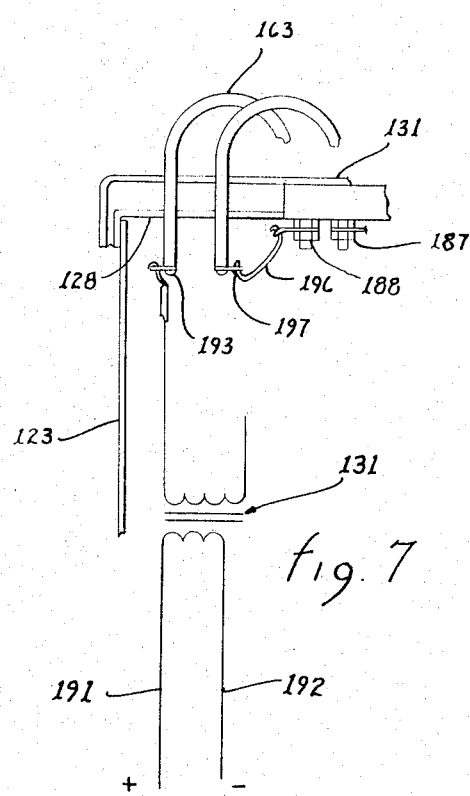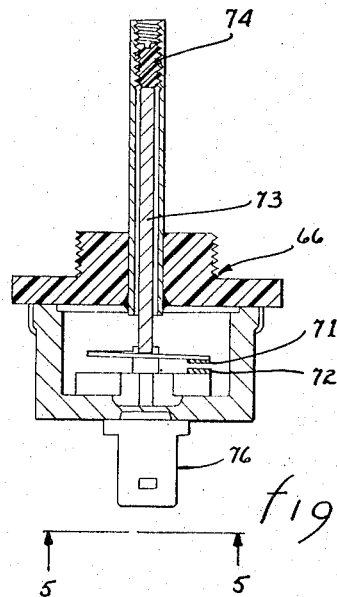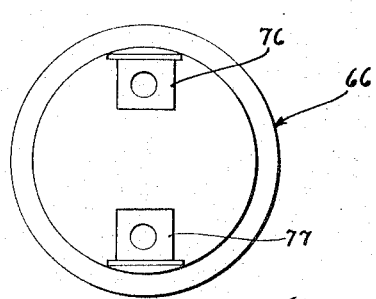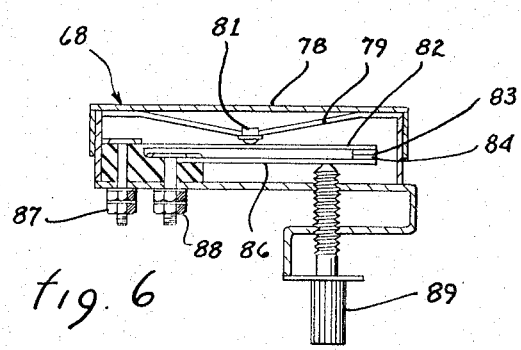

United States Patent Office 3,364,704
Patented Jan. 23, 1968

3,364,704
AUTOMATIC SAFETY GAS TORCH
Bernard J. Bernstein, 6029 N. 16th Drive,
Phoenix, Ariz. 85016
Filed Feb. 4, 1966, Ser. No. 525,213
8 Claims. (Cl. 67—116)

My invention relates to an automatic safety gas torch. It relates more in particular to a gas torch of the decorative, attention-attracting type which may be operated safely and effectively in any type of weather.

As electrical installations, particularly for lighting, began to replace gas, gas lights begin to disappear completely in areas wired for electricity. Gas was used almost exclusively for heating and cooking purposes, and even for the latter purpose was replaced in part by electric stoves. This reduction in the use of gas for lighting extended not only to conventional lighting such as in homes and out in the streets, but also to lighting employed for decorative and display purposes. In recent years, however, gas has been used increasingly for certain types of decorative and display purposes including the use of many types of gas torches for outdoor use. Some of these torches are relatively very simple in construction but many are elaborate and produce a very large flame, particularly in those instances where the torch is used for display purposes, or decoration in public areas such as around a swimming pool, they also in part perform the function of reducing insect problems. In any case, there are a relatively large number of torches of large size used exteriorly, many of which are lighted with pilot lights which must be kept continuously burning and commonly with safety mechanisms to prevent their going on when the pilot light has been extinguished. Even existing gas torches which ignited electrically are subject to excessive failure. All torches of this type cause a very great deal of difficulty during rain and snow. Indeed, they may be rendered substantially completely useless by the accumulation of so much snow as to form a solid body of ice-like deposit in the upper part of the torch housing, such as to require major attention. Structures are frequently placed in a high position, and it is a major service problem to keep them in operating condition.

Accordingly, the principal object of my present invention is the provision of an improved gas torch of the type identified.

Another object is the provision of an improved safety gas torch which will operate continuously in any kind of weather and which requires no continuously burning pilot light and a very minimum of service.

A further object of the invention is the provision of a gas torch provided with heating mechanism to raise the temperature of the ambient air and to dissipate rain, snow and ice if present so that the gas burner cannot be ignited until a sufficiently high temperature and suitable environmental conditions have been established to maintain the burner flame.

A still further object of the invention is the provision of a spark plug ignited burner in a torch of the type identified with means to prevent delivery of gas to the burner and actuation of the gas igniting spark plug until suitable 'environmental conditions for flame propagation have been established.

Yet another object of the invention is the provision of a torch of the type identified in which activation of the spark plug is discontinued after the flame has been established sufficiently long to raise the general temperature of the environment, and to discontinue actuation of the heating element and continued operation of the burner and the establishment of fully operative environmental conditions such that the flame will continue to operate regardless of weather conditions in existence at the time.

Other specific objects and features of the invention will be apparent from the following detailed description taken with the accompanying drawings wherein—

FIG. 1 is an isometric view showing the burner of my present invention mounted on a standard shown broken away and illustrating schematically an illustrative location of an electric switch by means of which the entire automatic operation of the gas torch is established;

FIG. 2 is an enlarged sectional view partly schematic and showing in approximate position circuitry for automatically controlling the operation of the gas torch of my invention;

FIG. 3 is a further enlarged perspective view of the torch of my invention with parts broken away and shown in section for purposes of illustration, the parts appearing in FIG. 3 occupying the same general position as the corresponding parts shown in FIG. 2;

FIG. 4 is an enlarged sectional view taken on the line 4—4 of FIG. 3;

FIG. 5 is a bottom plan view looking upwardly at FIG. 4 along the line 5—5;

FIG. 6 is a longitudinal sectional view showing illustratively the construction of a surface mounted thermostatic control indicated in elevation in each of FIGS. 2 and 3; and FIG. 7 is a fragmentary view partly schematic showing a modification which may be employed for the heating element.

Referring now to the drawings, the gas torch of the present invention indicated generally by the reference character 10 in FIG. 1 is adapted to be supported on a standard 11 of any suitable type and usually is supported at a considerable distance from the ground. The standard 11 therefore may be mounted at its lower end in various ways, including a base (not shown) mounted on the ground itself, or a suitable base mounted on a frame portion of a building. The particular manner of mounting the standard 11 to place the torch 10 at the desired elevation is therefore of no particular significance so far as the present invention is concerned. The torch is operated automatically and entirely through the closing of a suitable switch 12 which may be mounted in any convenient position. It is here shown mounted on the standard 11. The torch includes a functional housing indicated generally by the reference character 13 (see FIG. 3) and a decorative housing which is exterior of the functional housing 13 and here includes a vase-shaped assembly with a plurality of fins 14 secured at their upper out-flared portion to a flared ring 16 having an annular flange 17 for support of the functional housing, as will be explained. A generally hemispherical base 18 has a lower apertured boss 19 for receipt of the standard 11, which as shown particularly in the schematic view of FIG. 2, may be in the form of a hollow pipe through which a gas pipe 21 and electrical cable 22 may be extended.

The functional housing includes a tubular portion 23 and a bottom portion 24 which has an annular downwardly projecting apron 26 secured as by welding to the tubular portion 23 of the housing. As shown particularly in FIG. 2, the portion 18 has an upper annular recessed portion 27 which projects into the apron portion of the bottom 24 of the functional housing and provides a shoulder of sufficient width as to cause the decorative housing and the portion 18 to define a continuous line as both FIGS. 1 and 2 show.

The functional housing 13 is closed at its upper end by a lower top portion 28 which is shown structurally in FIG. 3 as an annular apron 29 extending outside the tubular portion 23 and suitably releasably secured thereto. A press fit is adequate. An upper top portion 31 is spaced from the lower top portion 24 by a heavy layer 32 of suitable heat insulation such as asbestos. A plurality of horizontal hangers 33, four being shown in the drawings, are secured radially to the top face of the upper top portion 31 as by welding or brazing and each of the hangers 33 is provided with a hole 34 through which nuts and bolts 36 (FIG. 2) extend to hold the entire functional housing assembly in fixed position with respect to the annular flange 17. The entire assembly as shown in FIG. 3, therefore, can first be fully assembled and then inserted into or removed from the decorative outer housing in the course of installation of the torch.

As has been pointed out, the torch is operated by electrical controls and entirely automatically. A simple electrical circuit producing this result is incorporated in FIG. 2, but before describing the electrical connections, reference will be made to structure, including the placement of components which are assembled in the manner shown in FIG. 3.

An ordinary gas pipe 38 leads to a source of gas under pressure and has an adapter 39 secured to its upper end, and the standard form of adapter 39 in turn has connected to it a special adapter 41 which extends through the bottom 24 and engages into an elbow 42. A suitable gasket 43 is clamped in position to seal the functional housing at this point, and to assure firm attachment. Elbow 42 is of the street elbow type, and it has its male threaded end secured into a second elbow 44 which in turn leads to a vertical gas line 46 connected to the bottom of a solenoid valve 47. I may employ for this purpose a control valve such as a series 91 Penn-Baso valve such as manufactured by Penn Controls, Inc., of Gaston, Ind. I have shown this valve partly in section and partly broken away to make it clear that the valve is normally closed by the engagement of valve 48 against its seat 49 but that when the solenoid indicated generally by the reference character 51 is energized, the sliding armature 52 will be actuated and draw the valve 48 away from its seat and permit gas to flow through the valve and through a pair of elbows 53 and 54 and into a nipple 56 and running through the top of the housing and connected by a fitting 57 to the burner 58 having a plurality of radial orifices 59. A spark plug 61 is connected to a source of power providing high voltage to a spark plug electrode 62 which, when the spark plug is energized, will cause a hot intense spark in the gap between burner 58 and electrode 62. The electrode 62 can be formed of any suitable metal commonly used for this purpose.

An electrical heating unit provided, here shown as being of the Calrod type and indicated by the reference character 63. Its two ends project through weather sealing fittings 64 extending such ends through the top members 29, 31 and 32. Each end is provided with a terminal for making electrical connections for delivery of power to the heating unit. In this way, all of the electrical connections are made inside the functional housing 13.

Projecting through the housing top is a thermostatic device 66 shown in more detail in FIG. 4 and described more specifically hereinbelow. Further removed from the electrical heating unit 63 is a second thermostatic control 67. Further reference will also be made to this particular thermostatic control. A third thermostatic device, indicated generally by the reference character 68, is mounted against the bottom surface of the upper housing top 31. Thermostatic devices 66 and 67 also project entirely through the top, so that so far as all three thermostatic devices are concerned, all of the electrical connections are made with the functional housings.

As will be further explained, the function of thermostat 66 will be clear from the description of the functions of the torch, the thermostatic device 66 has a pair of normally open contacts 71 and 72, the former being adjustable through the expanding action of the rod 73, and the latter being supported in a relatively low expansion tube as shown (FIG. 4). The temperature at which the contacts are closed is determined by a threaded adjustment member 74 which controls the position above the top end of the expandable thermostatic rod 73. Connections, not shown in FIGS. 4 and 5, are made between the contacts 71 and 72, and the terminals 76 and 77 respectively. For a more complete description of the structure of a suitable commercial structure, reference may be made to the 10P100 type units manufactured by Stevens Manufacturing Company of Mansfield, Ohio. This is only one of many such thermostats which may be used and commercially available and usable with little or no modification.

The thermostatic device 67 may be substantially identical with thermostat 66, but with normally closed contacts which open in response to differential expansion of parts to open the contacts when a predetermined temperature is reached. Thermostats of this type are so well known, such as in the Stevens line, that detailed illustration of a thermostat with normally closed contacts appears unnecessary.

The surface mounted temperature responsive thermostatic device 68 is also of conventional type and illustratively I may use a series 30,000 unit manufactured by Fenwal, Inc. of Ashland, Mass. I show such a device illustratively, however, in FIG. 6. Such a device has a high expansion steel housing 78 with a low extension metal bridge 79 with a center button 81 engaging an arm 82 carrying one contact 83 which engages a second contact 84 carried by arm 86. The arms 82 and 86 lead to terminals 87 and 88 as shown. An adjusting screw 89 permits control of the temperature by which this device is actuated. As shown in the drawings, the contacts 83 and 84 are normally closed; but when the expanding steel case 78 reaches a predetermined temperature determined in part by the positioning of the adjusting screw 89, the low expansion metal bridge will be raised, and allow the spring arm 82 to move upwardly thus removing the contact 83 from the contact 84 and opening a circuit in which this control is employed.

Two main conductors 91 and 92 lead to the switch 12 and through the switch are connected to a source of commercial power, such as 115 volts alternating current. The conductor 92 leads directly to one terminal 93 of the electrical heating unit 63. As indicated both in FIGS. 2 and 3, the conductor line 91 leads directly to terminal 76 of the thermostatic device 66, but a jumper 94 interconnects conductor 91 and terminal 87 of the normally closed thermostatic device 68. A second jumper 96 interconnects terminal 88 of thermostat 68 and a terminal 97 of the electrical heating unit 63 to complete the power circuit thereto. This circuit includes the line 92, the electrical heating unit 63, jumper 96, the surface active thermostatic device 68 and its normally closed contacts, jumper 94, and line 91. This circuit is live as soon as the switch 12 is turned on, and power will be supplied to the electrical heating unit 63 and it will start to get hot.

As part of the electrical circuitry, consideration must be given to a coil assembly indicated generally by the reference character 99 and suitably supported in position within the functional housing. For simplicity, I have shown a strap type support 101 suitably attached to the housing of the coil and secured by a double line of weld 102 to the gas pipe 46. Further details of the coil 99 are brought out in the circuit diagram forming a part of FIG. 2.

It will be recalled that the contacts 71 and 72 of the thermostatic device 66 are normally open, but when a predetermined environmental temperature has been attained which is reflected by the development of an operating temperature in the thermostatic device 66 itself, the contacts 71 and 72 are closed and through the terminals 76 and 77, conductor 91 becomes connected to conductor 103, leading to the solenoid coil 51, the circuit being completed by a conductor 104 interconnecting the solenoid coil and conductor 92, thus completing the circuit through the solenoid coil and energizing it to admit gas to the burner 58.

At the same time that gas is delivered to the burner 58, the industrial style spark plug 61 is also energized to ignite gas as it escapes from the burner and thus to propagate the flame which rises to a considerable height as shown in FIG. 1. In this connection, it will be recalled that the contacts of the thermostatic device 67 are normally closed. A connecting line 106 stands between the conductor 103 and terminal 107 of the thermostatic device 67. The second terminal 108 of thermostat 67 is connected to a conductor 109 which leads to coil 99. A simplified circuit diagram of the coil 99 is included in FIG. 2. Suitably, this coil may be of the type manufactured by Blackstone Manufacturing Company of Chicago, Ill., and identified as their Catalog No. C-2560. It includes an input transformer 111, the primary of which is connected to a conductor 112 which completes the circuit by being connected to input conductor 92. An output transformer receiving power from the input transformer has a primary coil 113 and a secondary coil 114, the former functioning to close contacts 116 when this coil is energized, and the secondary having one end connected to ground at 117 and the opposite end connected to a conductor 118 which as shown in FIG. 2 leads to the industrial type spark plug 61. This circuit delivers high voltage, low amperage power to the member 62, which causes a hot spark for igniting the gas.

When the flame has been established in accordance with normal operating conditions, it is not essential that the spark be continued and I therefore provide means for discontinuing arcing from the member 62 when the temperature of the environment has reached a predetermined point somewhat above that which is essential to actuate the spark plug. This function is produced through the instrumentality of the thermostatic device 68 which is further removed from the heating unit 63 than thermostat 66, but is in a position to receive heat from the gas flame. It will be recalled that the thermostat 67 is of a type in which the contacts are normally closed. When a predetermined temperature in the environment of this thermostat is reached, however, it is actuated to open its contacts and break the connection between conductors 106 and 109. Since conductor 109 leads to one side of the primary of the input transformer 111, high voltage delivered to the spark plug 61 will be discontinued by the opening of this circuit.

When operating conditions are fully established, it is also no longer necessary to heat the unit 63. It will be noted that the terminals 87 and 88 of thermostat 68 (see FIGS. 2 and 6) have connections to conductors 94 and 96 respectively; conductor 96 leads to one side of the electrical heating unit 63. When the surface temperature of the upper top member 31 against which the steel case 78 of the unit 68 rests, the expansion of this steel case differentially with respect to the low expansion bridge 79 will cause the contacts 83 and 84 to separate, and delivery of line voltage to the Calrod unit is discontinued. In the event of the use of a heating unit involving operation at a modified current value, appropriate connections to discontinue current to the heating unit are, of course, provided.

In some instances, I find it advisable to protect the burner and other parts of the torch from the elements and for this purpose I may employ a cover 121 suitably held in position such as by means of a threaded projection 122 having its bottom end braised or welded to the top face of the burner 58 and a nut 123 (FIG. 1) holding the cover in position. For convenience of illustration, the protective cover 121 is shown in broken lines in FIG. 2. Illustratively there is a central portion projecting only slightly beyond the burner 58 and an extension which is elevated and protects that part of the unit 63 which is immediately adjacent to the thermostatic device 66 which is effective to turn on the gas and ignite it.

Before explaining the operation of the torch of my present invention, I wish to point out that the type of heating unit employed may vary greatly. One essential is, of course, the provision of adequate heating reasonably quickly, and that freedom from breakdown or burnout be assured in order to reduce maintenance cost to a minimum. The Calrod unit meets these requirements. I may, however, employ a modified structure such as indicated in FIG. 7 in which a heating unit 163 may be employed which is of a type requiring higher amperage and lower voltage for its most successful performance. In this connection, a transformer 131 has its primary connected across the conductors 191 and 192 leading to switch 13, and the secondary is connected to the heating unit 163 in the general manner shown in the main embodiment of the invention. In FIG. 7, I have employed the same reference characters as employed in FIGS. 2 and 3, with, however, the prefix "1" to indicate modification. For convenience, only part of the circuit is shown in FIG. 7, but it will be understood that unit 163 may be disconnected or de-energized in the same general manner as the heating unit 63. The heating unit 163 may be of any type which may be responsive to high amperage such, for example, as a relatively heavy stainless steel or Nichrome wire, many of which types of heating coils are known.

In describing the operation of the torch of the present invention, assumption will be made that ambient temperatures are below freezing and that precipitation has caused an accumulation of rain, snow and ice in the upper exposed portion of the torch. The torch is activated by turning on the switch 12, which may be located in any suitable position, and heat is immediately imparted to the heating unit. The first action, of course, is gradually to melt whatever ice and/or snow has been accumulated, and the resulting liquid will run off the top face of the upper top member 31 and escape through the spaces provided in the decorative housing portion 14. As the liquid runs off, residual water will begin to vaporize to dry off the burner and other parts which may have become wetted. When a sufficiently high temperature has been established predetermined by the setting of the thermostatic device 66, the contacts 71 and 72 (FIG. 4) are closed, gas is admitted to the burner by activation of the solenoid valve 51 and high voltage is delivered to the industrial-type spark plug 61 to initiate combustion. As the gas moves radially through the orifices 59, it escapes around the side edges of the midpoint of the cover 121 and mixes with ambient air to produce a desired luminous yellow flame which may show at night to a height of two or three feet or even more, depending upon the size of the torch and its adjustment. At this time, the flame will raise the temperature of the thermostatic device 67 and turn off the spark plug. If the flame is able to continue to propagate itself because of conditions which have been established, the temperature effective against the thermostatic device 68 will be raised and the heating unit 63 will be de-energized.

Should conditions for maintenance of the flame not be adequate after it has once started, and it should become extinguished, then the thermostatic device 67 will either have been activated or not. If its contacts are still closed, the spark plug will still be in operation and the flame will immediately be reignited. Should the contacts of the thermostatic device 67 have been opened, however, because of increase in temperature in the environment of this device, the loss of flame will cause the thermostatic device 67 to cool down rapidly, and a circuit will again be established which will cause the spark plug 61 to become effective and reignite the flame. If by any chance the flame should go out under such conditions that the thermostatic device 66 can also cool off, such as will occur if the thermostatic device 68 has heated sufficiently to discontinue current to the heating unit 63, then loss of flame will also result in the cooling of the thermostatic device 66 and the opening of its contacts 71 and 72. This function will then have the effect of shutting off the gas to the burner and delivering power to the heating unit 63 just as in the case of the initial starting, except that the time required for the contacts 71 and 72 to be closed will be much shorter than required under the conditions first postulated.

I have shown and described a preferred embodiment of my invention so that those skilled in the art may understand the manner of practicing the same with the scope of the invention as defined by the claims.

I claim:
1. In a safety gas torch of the character described
   (a) an open flame type burner,
   (b) an electrically operated solenoid valve controlling delivery of gas to said burner,
   (c) an electrical heating unit positioned sufficiently close to said burner to heat the same and vaporize ambient moisture which could inhibit satisfactory burning of gas delivered to said burner,
   (d) a spark plug positioned to ignite gas emanating from said burner, and
   (e) means for automatically actuating said solenoid to deliver gas to said burner and simultaneously to energize said spark plug when said heating unit has increased ambient atmospheric temperature to a predetermined value.

2. A gas torch as defined in claim 1 wherein said last-mentioned means includes a thermostat with normally open contacts disposed relatively close to said heating unit, said contacts forming a part of a circuit including a coil of said solenoid, said spark plug and a source of electric power.

3. A gas torch as defined in claim 1, including means for de-energizing said spark plug when the said ambient atmosphere has reached a second predetermined value above the first-mentioned temperature value.

4. A gas torch as defined in claim 1, including means for de-energizing said spark plug when the said ambient atmosphere has reached a second predetermined value above the first-mentioned temperature valve, said last-mentioned means functioning to permit reactivation of said spark plug in the event the gas flame should fail whereby to permit reignition of gas emerging from the burner to re-establish said flame.

5. A gas torch as defined in claim 1 including solenoid means for discontinuing of electrical power delivery to said electric heating element when temperature in the environment of the flame reaches a predetermined upper value.

6. A gas torch as defined in claim 1 wherein said last-mentioned means includes a thermostat with normally open contacts disposed relatively close to said heating unit, said contacts forming a part of a circuit including a coil of said solenoid, said spark plug and a source of electric power, and including a second thermostat positioned relatively further away from the heating unit than the first-mentioned thermostat and circuit connections to deactivate the spark plug when the ambient temperature reaches a higher value than that at which the first-mentioned thermostat operates.

7. A gas torch as defined in claim 1 wherein said last-mentioned means includes a thermostat with normally open contacts disposed relatively close to said heating unit, said contacts forming a part of a circuit including a coil of said solenoid, said spark plug and a source of electric power, and including a second thermostat positioned relatively further away from the heating unit than the first-mentioned thermostat and circuit connections to deactivate the spark plug when the ambient temperature reaches a higher value than that at which the first-mentioned thermostat operates, and a thermostatic switch respective to surface temperature at a point in the vicinity of the burner for de-energizing said electrical heating unit when the burner flame has heated said surface to a predetermined value.

8. In a safety gas torch of the character described,
   (a) means forming a housing with a horizontal top,
   (b) a burner supported on said top,
   (c) a gas line extending through the housing and connected to the burner,
   (d) a solenoid valve in said gas line disposed within the housing,
   (e) an electrical heating unit supported above said housing in a position to heat said burner, said burner housing terminals within the housing sealed through said top,
   (f) a first thermostat with normally open contacts with a sensing element projecting through the top and contiguous to said heating unit,
   (g) a second thermostat with normally closed contacts with a sensing element projecting through the top and spaced to be heated by flame from said burner,
   (h) a third thermostat with a sensing element in contact with a bottom surface of said top,
   (i) an industrial type spark plug projecting through the top with a sparking probe disposed in sparking relation with said burner,
   (j) a spark coil for delivering relatively high voltage to said spark plug,
   (k) means providing a source of commercial type AC voltage within said housing,
   (l) a switch,
   (m) means for delivering electric power to the heating unit when said switch is turned on, and
   (n) circuitry
       (1) to actuate said solenoid valve, deliver gas to the burner and activate said spark plug when the first thermostat reaches a predetermined temperature,
       (2) to discontinue operation of the spark plug when said thermostat reaches a predetermined temperature, and
       (3) to discontinue delivery of electric power to said heating unit when the sensing element of said thermostat reaches a predetermined temperature.

No references cited.

FREDERICK KETTERER, *Primary Examiner.*